United States Patent
Gao

(10) Patent No.: US 12,302,337 B2
(45) Date of Patent: May 13, 2025

(54) DATA TRANSMISSION METHOD, NETWORK SIDE DEVICE, AND USER EQUIPMENT

(71) Applicant: DATANG MOBILE COMMUNICATIONS EQUIPMENT CO., LTD., Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 631 days.

(21) Appl. No.: 17/420,382

(22) PCT Filed: Dec. 27, 2019

(86) PCT No.: PCT/CN2019/129101
§ 371 (c)(1),
(2) Date: Jul. 1, 2021

(87) PCT Pub. No.: WO2020/140837
PCT Pub. Date: Jul. 9, 2020

(65) Prior Publication Data
US 2022/0095352 A1    Mar. 24, 2022

(30) Foreign Application Priority Data
Jan. 2, 2019    (CN) .......................... 201910001543.8

(51) Int. Cl.
*H04W 72/23*     (2023.01)
*H04L 5/00*     (2006.01)
(Continued)

(52) U.S. Cl.
CPC .......... *H04W 72/23* (2023.01); *H04L 5/0053* (2013.01); *H04L 5/0087* (2013.01);
(Continued)

(58) Field of Classification Search
CPC ... H04L 5/0053; H04L 5/0064; H04L 5/0087; H04L 5/0094; H04L 27/2602;
(Continued)

(56) References Cited

U.S. PATENT DOCUMENTS 11,832,292 B2 * 11/2023 Fu ..................... H04W 72/1268
2016/0345206 A1   11/2016 Yerramalli et al.
(Continued)

FOREIGN PATENT DOCUMENTS

CN    107734676 A    2/2018
CN    108633071 A    10/2018
(Continued)

OTHER PUBLICATIONS

First Korean Office Action for Korean Patent Application 10-2021-7024287 issued on Sep. 8, 2022, and its English Translation provided by global dossier.
(Continued)

*Primary Examiner* — Ricky Q Ngo
*Assistant Examiner* — Kabir U Jahangir
(74) *Attorney, Agent, or Firm* — Ladas & Parry, LLP

(57) ABSTRACT

A data transmission method, a network side device and user equipment are provided. The method includes: sending a first downlink control information DCI for scheduling first transmission; wherein in a case that a relation between the first transmission and scheduled or configured second transmission satisfies a preset condition, a time instant of sending the first DCI is not later than a time instant with a time duration T before a starting symbol of the second transmission.

20 Claims, 4 Drawing Sheets

(51) Int. Cl.
*H04L 27/26* (2006.01)
*H04W 72/566* (2023.01)
(52) U.S. Cl.
CPC ........ *H04L 5/0094* (2013.01); *H04L 27/2602* (2013.01); *H04W 72/569* (2023.01)
(58) Field of Classification Search
CPC ............. H04W 72/0446; H04W 72/23; H04W 72/569; H04W 72/1273; H04W 72/0453; H04W 72/232; H04W 72/512; H04W 72/56

See application file for complete search history.

(56) References Cited

U.S. PATENT DOCUMENTS

| | | | |
|---|---|---|---|
| 2018/0270798 | A1 | 9/2018 | Park et al. |
| 2018/0279274 | A1 | 9/2018 | Sun et al. |
| 2019/0254058 | A1 | 8/2019 | Xie et al. |
| 2019/0260529 | A1 | 8/2019 | Tang et al. |
| 2019/0394011 | A1 | 12/2019 | Liu |
| 2020/0028642 | A1 | 1/2020 | He et al. |
| 2020/0053748 | A1* | 2/2020 | Hosseini ............. H04W 72/569 |
| 2020/0053765 | A1* | 2/2020 | Chien ................... H04L 1/1861 |
| 2020/0196333 | A1* | 6/2020 | Lin ......................... H04W 8/24 |
| 2020/0213955 | A1* | 7/2020 | Hosseini ........... H04W 72/0473 |
| 2020/0374909 | A1* | 11/2020 | Takeda ................. H04W 72/535 |
| 2021/0298046 | A1* | 9/2021 | Li ....................... H04W 52/367 |
| 2021/0329663 | A1* | 10/2021 | Wong .................. H04W 72/569 |
| 2022/0039100 | A1* | 2/2022 | Yoshioka ............ H04W 72/543 |
| 2022/0086659 | A1* | 3/2022 | Wang ................ H04W 52/0235 |
| 2022/0377717 | A1* | 11/2022 | Park ...................... H04L 1/1822 |

FOREIGN PATENT DOCUMENTS

| | | |
|---|---|---|
| CN | 108667579 A | 10/2018 |
| CO | 108702768 A | 10/2018 |
| WO | 2018082660 A1 | 5/2018 |
| WO | 2018/166254 A1 | 9/2018 |

OTHER PUBLICATIONS

"Uplink inter UE multiplexing/prioritization for enhanced URLLC," 3GPP TSG RAN WG1 Meeting #94, R1-1808788, Gothenburg, Sweden, Aug. 20-24, 2018, Agenda Item: 7.2.6.2, Source: Samsung, all pages.
"On NR URLLC UL inter UE Tx prioritization/multiplexing," 3GPP TSG RAN WG1 Meeting #94, R1-1810475, Chengdu, China, Oct. 8-12, 2018, Agenda Item: 7.2.6.3, Source: Panasonic, all pages.
"Discussion on UL inter UE Tx prioritization," 3GPP TSG RAN WG1 Meeting #94bis, R1-1810295, Chengdu, China, Oct. 8-12, 2018, Agenda Item: 7.2.6.3, Source: LG Electronics, all pages.
European Search Report for European Patent Application 19 90 7155.6, issued Feb. 11, 2022.
First office action and search report for Chinese Patent Application 201910001543.8 issued on Mar. 28, 2022.
"Discussion on V2X PC5 Scheduling, Resource Pools and Resource Patterns" 3GPP TSG RAN WG1 Meeting #84 R1-161075, Malta, Feb. 15-19, 2016 Agenda Item: 7.3.2.2.2 Source: Ericsson.
Second Korean Office Action for corresponding Korean Patent Application 10-2021-7024287 issued on Apr. 14, 2023, and its English Translation provided by global dossier.
"Remaining issues on scheduling and HARQ," 3GPP TSG RAN WG1 Meeting #94bis, R1-1810371,Chengdu, China, Oct. 8-12, 2018, Source: vivo, Agenda Item: 7.1.3.3, all pages.
"Remaining issues on scheduling and HARQ," 3GPP TSG RAN WG1 Meeting #94bis, R1-1812320, Chengdu, China, Oct. 8-12, 2018, Source: vivo, Agenda Item: 7.1.3.3, all pages.
"DL intra UE Tx prioritization for URLLC," 3GPP TSG RAN WG1 Meeting #95, R1-1812321, Spokane, USA, Nov. 12-16, 2018, Source:vivo, Agenda: 7.2.6.4, all pages.
Third Office Action for corresponding European Patent Application No. 19907155.6 issued by the European Patent Office on Jun. 22, 2023.
"Discussion on eMBB and URLLC multiplexing for uplink," 3GPP TSG RAN WG1 Meeting #88bis, R1-1704923, Spokane, USA Apr. 3-7, 2017, Agenda Item: 8.1.3.3.6, Source: LG Electronics, all pages.
"Discussion on UL multiplexing of grant-based eMBB and URLLC," 3GPP TSG RAN WG1 Meeting #90, R1-1712207, Prague, Czech Republic, Aug. 21-25, 2017, Agenda Item: 6.1.3.3.9, Source: Huawei, HiSilicon, all pages.
Samsung, "eMBB and URLLC multiplexing in DL", R1-1612540, 3GPP TSG RAN WG1 Meeting #87, Reno, USA, Nov. 14-18, 2016, all pages.
Guangdong OPPO Mobile Telecom, "On multiplexing eMBB and URLLC in DL", R1-1700572, 3GPP TSG RAN WG1 NR AdHoc, Spokane, USA, Jan. 16-20, 2017, all pages.
Guangdong OPPO Mobile Telecom, "DL control channel design for URLLC", R1-1701963, 3GPP TSG RAN WG1 Meeting #88, Athens, Greece, Feb. 13-17, 2017, all pages.
Huawei, HiSilicon, "On pre-emption indication for DL multiplexing of URLLC and eMBB", R1-1708124, 3GPP TSG RAN WG1 Meeting #89, Hangzhou, China, May 15-May 19, 2017, all pages.
Qualcomm Incorporated, "URLLC DL pre-emption and UL suspension indication channel design", R1-1718573, 3GPP TSG-RAN WG1 #90bis, Prague, Czech Republic, Oct. 9-13, 2017, all pages.
International Search Report from PCT/CN2019/129101, dated Mar. 27, 2020, with English translation from WIPO, all pages.
Written Opinion of the International Searching Authority from PCT/CN2019/129101, dated Mar. 27, 2020, with English translation from WIPO, all pages.
International Preliminary Report on Patentability from PCT/CN2019/129101, dated Jun. 16, 2021, with English translation from WIPO, all pages.

* cited by examiner

Sending a first downlink control information (DCI) for scheduling a first transmission;
wherein in a case that a relation between the first transmission and scheduled or configured second transmission satisfies a preset condition, a time instant of sending the first DCI is not later than a time instant with a time duration T before a starting symbol of the second transmission
S310

Fig.3

Receiving a first downlink control information (DCI) for scheduling a first transmission;
wherein in a case that a relation between the first transmission and scheduled or configured second transmission satisfies a preset condition, a time instant of receiving the first DCI is not later than a time instant with a time duration T before a starting symbol of the second transmission
S410

Fig.4

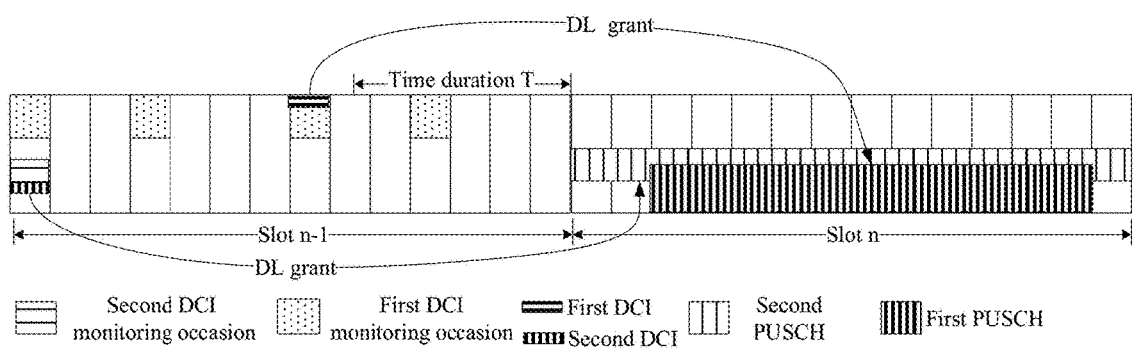

Fig.5

DATA TRANSMISSION METHOD, NETWORK SIDE DEVICE, AND USER EQUIPMENT

CROSS REFERENCE TO RELATED APPLICATIONS

The present application is the U.S. national phase of PCT Application No. PCT/CN2019/129101 filed on Dec. 27, 2019, which claims a priority of Chinese patent application No. 201910001543.8 filed in China on Jan. 2, 2019, the disclosures of which are incorporated in their entireties by reference herein.

TECHNICAL FIELD

The present disclosure relates to the field of wireless communication technologies, in particular, relates to a data transmission method, a network side device and user equipment.

BACKGROUND

With evolution and changes of demands on mobile communication services, multiple organizations such as International Telecommunications Union (ITU) have begun to research a new wireless communication system (i.e., $5^{th}$ Generation New RAT (5G NR)) to be used as a future mobile communication system. In 5G, there are various services with different priorities, latency requirements or transmission time intervals, e.g., Enhanced Mobile Broadband (eMBB) service and Ultra Reliable Low Latency Communications (URLLC) service, and massive wan (mMTC) service or the like may also be present. A service stream with very strict latency and reliability requirements occurs sporadically and randomly, thus if multiplexing of the service and another service with a different requirement onto a same resource is supported, resource utilization may be improved significantly.

Therefore, a terminal may support multiple different types of services simultaneously, such as eMBB and URLLC, or support services of the same service type, but with different priorities, simultaneously. When a terminal has been scheduled to conduct transmission of a service, e.g., an eMBB service, a service with a higher priority, e.g., URLLC service, may require transmission. Due to the stringent latency requirement of the URLLC service, it is necessary to schedule and conduct transmission of the URLLC service as soon as possible, and transmission of the URLLC service cannot be scheduled to be later than the completion of the eMBB service transmission. As a result, a situation where the URLLC service overlays the eMBB service may occur.

Taking downlink transmission for example, as shown in FIG. 1, transmission resources of a second physical downlink shared channel (PDSCH) scheduled by later sent Downlink Control Information (DCI) (a second DCI) may overlap, in time domain and/or frequency domain, transmission resources of a first PDSCH scheduled by an earlier DCI (a first DCI). In this case, in overlapped positions, the second PDSCH may overlay the first PDSCH, that is, the first PDSCH is interrupted. However, due to the second DCI is sent later, UE may have already received a portion of the first PDSCH in non-overlapped positions. Furthermore, since a time instant for sending the second DCI is not definite, a following situation may occur: the terminal may have received a portion of the first PDSCH by the time the second DCI is received; nevertheless, even if the first PDSCH is received, it is highly probable that the received first PDSCH cannot be decoded correctly since a portion of resources of the first PDSCH is occupied by other high-priority data. The same is true for uplink transmission. If a resource of ongoing physical uplink shared channel (PUSCH) transmission is occupied by another PUSCH, it is highly probable that an interrupted PUSCH cannot be decoded correctly.

As a result, reception or sending of interrupted data by the terminal is in effect waste of power. There is no explicit method for avoiding such power waste.

SUMMARY

The present disclosure aims to provide a data transmission method, a network side device and user equipment, to solve the problem in the related art that a transmission failure may occur to overlaid data transmission when two transmission resources overlay each other, leading to waste of processing resources and power resources used in the preparation and sending of the data transmission.

An embodiment of the present disclosure provides a data transmission method, performed a network side device, including:

sending a first downlink control information (DCI) for scheduling a first transmission;

wherein in a case that a relation between the first transmission and scheduled or configured second transmission satisfies a preset condition, a time instant of sending the first DCI is not later than a time instant with a time duration T before a starting symbol of the second transmission.

Optionally, in the data transmission method, the preset condition includes at least one of following:

the first transmission and the second transmission are in a same cell or on a same carrier, a transmission resource of the first transmission overlaps a transmission resource of the second transmission, and a priority of the first transmission is higher than a priority of the second transmission;

the first transmission and the second transmission are in a same cell or on a same carrier, the first transmission and the second transmission are transmitted on different time domain resources in a same slot, reception or sending of more than one transmission in a same slot in a same cell or on a same carrier is not supported at a terminal side, and a priority of the first transmission is higher than a priority of the second transmission.

Optionally, in the data transmission method, that the transmission resource of the first transmission overlaps the transmission resource of the second transmission includes at least one of following:

only time domain transmission resources overlap;

time domain transmission resources overlap and frequency domain transmission resources overlap;

time domain transmission resources overlap, frequency domain transmission resources do not overlap, and reception or sending of more than one transmission at a same time instant is not supported at the terminal side.

Optionally, in the data transmission method, it is determined that the priority of the first transmission is higher than the priority of the second transmission when the relation between the first transmission and the second transmission satisfies at least one of following conditions:

a sending time of the first DCI is later than a sending time of a second DCI for scheduling the second transmission;

the second transmission is semi-statically configured transmission;

a transmission length of the first transmission is less than a transmission length of the second transmission;

it is determined that the priority of the first transmission is higher than the priority of the second transmission according to transmission parameters corresponding to the first transmission and the second transmission respectively.

Optionally, in the data transmission method, the transmission parameters include at least one of following parameters:

DCI, a radio network temporary identifier (RNTI), a control resource set (CORESET), a search space, a target block error rate (BLER), a channel quality indicator (CQI), a modulation and coding scheme (MCS) table and a priority flag.

Optionally, in the data transmission method, that the time instant of sending the first DCI is not later than the time instant with the time duration T before the starting symbol of the second transmission includes:

a first symbol or a last symbol of the first DCI is not later than the time instant with the time duration T before the starting symbol of the second transmission; or, a first symbol or a last symbol of a CORESET where the first DCI is transmitted is not later than the time instant with the time duration T before the starting symbol of the second transmission; or, the first symbol or the last symbol of the first DCI is not later than a first symbol with the time duration T before the starting symbol of the second transmission; or, the first symbol or the last symbol of the CORESET where the first DCI is transmitted is not later than the first symbol with the time duration T before the starting symbol of the second transmission.

Optionally, in the data transmission method, the time duration T includes T OFDM symbols or T time lengths.

Optionally, the data transmission method further includes:

abandoning receiving the second transmission when the first transmission and the second transmission are uplink transmission;

abandoning sending the second transmission when the first transmission and the second transmission are downlink transmission.

The present disclosure further provides, in another embodiment, a data transmission method, performed by user equipment, including:

receiving a first downlink control information (DCI) for scheduling a first transmission;

wherein in a case that a relation between the first transmission and scheduled or configured second transmission satisfies a preset condition, a time instant of receiving the first DCI is not later than a time instant with a time duration T before a starting symbol of the second transmission.

Optionally, in the data transmission method, the preset condition includes at least one of following:

the first transmission and the second transmission are in a same cell or on a same carrier, a transmission resource of the first transmission overlaps a transmission resource of the second transmission, and a priority of the first transmission is higher than a priority of the second transmission;

the first transmission and the second transmission are in a same cell or on a same carrier, the first transmission and the second transmission are transmitted on different time domain resources in a same slot, reception or sending of more than one transmission in a same slot in a same cell or on a same carrier is not supported at a terminal side, and a priority of the first transmission is higher than a priority of the second transmission.

Optionally, in the data transmission method, that the transmission resource of the first transmission overlaps the transmission resource of the second transmission includes at least one of following:

only time domain transmission resources overlap;

time domain transmission resources overlap and frequency domain transmission resources overlap;

time domain transmission resources overlap, frequency domain transmission resources do not overlap, and reception or sending of more than one transmission at a same time instant is not supported at the terminal side.

Optionally, in the data transmission method, it is determined that the priority of the first transmission is higher than the priority of the second transmission when the relation between the first transmission and the second transmission satisfies at least one of following conditions:

a sending time of the first DCI is later than a sending time of a second DCI for scheduling the second transmission;

the second transmission is semi-statically configured transmission;

a transmission length of the first transmission is less than a transmission length of the second transmission;

it is determined that the priority of the first transmission is higher than the priority of the second transmission according to transmission parameters corresponding to the first transmission and the second transmission respectively.

Optionally, in the data transmission method, the transmission parameters include at least one of following parameters:

DCI, a radio network temporary identifier (RNTI), a control resource set (CORESET), a search space, a target block error rate (BLER), a channel quality indicator (CQI), a modulation and coding scheme (MCS) table and a priority flag.

Optionally, in the data transmission method, that, in the case that a relation between the first transmission and the scheduled or configured second transmission satisfies the preset condition, that the time instant of receiving the first DCI is not later than the time instant with the time duration T before the starting symbol of the second transmission includes:

a first symbol or a last symbol of the first DCI is not later than the time instant with the time duration T before the starting symbol of the second transmission; or, a first symbol or a last symbol of a CORESET where the first DCI is transmitted is not later than the time instant with the time duration T before the starting symbol of the second transmission; or, the first symbol or the last symbol of the first DCI is not later than a first symbol with the time duration T before the starting symbol of the second transmission; or, the first symbol or the last symbol of the CORESET where the first DCI is transmitted is not later than the first symbol with the time duration T before the starting symbol of the second transmission.

Optionally, in the data transmission method, the time duration T includes T OFDM symbols or T time lengths.

Optionally, the data transmission method further includes:

abandoning sending the second transmission when the first transmission and the second transmission are uplink transmission;

abandoning receiving the second transmission when the first transmission and the second transmission are downlink transmission.

Optionally, in the data transmission method, after the receiving the first DCI for scheduling the first transmission, the method further includes:

determining that the first DCI is an erroneous scheduling if the time instant of receiving the first DCI is later than the time instant with the time duration T before the starting symbol of the second transmission, in the case that a relation between the first transmission and the scheduled or configured second transmission satisfies the preset condition.

An embodiment of the present disclosure further provides a network side device, including: a storage, a processor and a program stored in the storage and executable by the processor, wherein the processor is configured to execute the program, to implement following steps:

sending a first downlink control information (DCI) for scheduling a first transmission;

wherein in a case that a relation between the first transmission and scheduled or configured second transmission satisfies a preset condition, a time instant of sending the first DCI is not later than a time instant with a time duration T before a starting symbol of the second transmission.

Optionally, in the network side device, the preset condition includes at least one of following:

the first transmission and the second transmission are in a same cell or on a same carrier, a transmission resource of the first transmission overlaps a transmission resource of the second transmission, and a priority of the first transmission is higher than a priority of the second transmission;

the first transmission and the second transmission are in a same cell or on a same carrier, the first transmission and the second transmission are transmitted on different time domain resources in a same slot, reception or sending of more than one transmission in a same slot in a same cell or on a same carrier is not supported at a terminal side, and a priority of the first transmission is higher than a priority of the second transmission.

Optionally, in the network side device, that the transmission resource of the first transmission overlaps the transmission resource of the second transmission includes at least one of following:

only time domain transmission resources overlap;

time domain transmission resources overlap and frequency domain transmission resources overlap;

time domain transmission resources overlap, frequency domain transmission resources do not overlap, and reception or sending of more than one transmission at a same time instant is not supported at the terminal side.

Optionally, in the network side device, it is determined that the priority of the first transmission is higher than the priority of the second transmission when the relation between the first transmission and the second transmission satisfies at least one of following conditions:

a sending time of the first DCI is later than a sending time of a second DCI for scheduling the second transmission;

the second transmission is semi-statically configured transmission;

a transmission length of the first transmission is less than a transmission length of the second transmission;

it is determined that the priority of the first transmission is higher than the priority of the second transmission according to transmission parameters corresponding to the first transmission and the second transmission respectively.

Optionally, in the network side device, the transmission parameters include at least one of following parameters:

DCI, a radio network temporary identifier (RNTI), a control resource set (CORESET), a search space, a target block error rate (BLER), a channel quality indicator (CQI), a modulation and coding scheme (MCS) table and a priority flag.

Optionally, in the network side device, that the time instant of sending the first DCI is not later than the time instant with the time duration T before the starting symbol of the second transmission includes:

a first symbol or a last symbol of the first DCI is not later than the time instant with the time duration T before the starting symbol of the second transmission; or, a first symbol or a last symbol of a CORESET where the first DCI is transmitted is not later than the time instant with the time duration T before the starting symbol of the second transmission; or, the first symbol or the last symbol of the first DCI is not later than a first symbol with the time duration T before the starting symbol of the second transmission; or, the first symbol or the last symbol of the CORESET where the first DCI is transmitted is not later than the first symbol with the time duration T before the starting symbol of the second transmission.

Optionally, in the network side device, the time duration T includes T OFDM symbols or T time lengths.

Optionally, in the network side device, the processor is further configured to:

abandon receiving the second transmission when the first transmission and the second transmission are uplink transmission;

abandon sending the second transmission when the first transmission and the second transmission are downlink transmission.

An embodiment of the present disclosure further provides user equipment, including: a storage, a processor and a program stored in the storage and executable by the processor, wherein the processor is configured to execute the program, to implement following steps:

receiving a first downlink control information (DCI) for scheduling a first transmission;

wherein in a case that a relation between the first transmission and scheduled or configured second transmission satisfies a preset condition, a time instant of receiving the first DCI is not later than a time instant with a time duration T before a starting symbol of the second transmission.

Optionally, in the user equipment, the preset condition includes at least one of following:

the first transmission and the second transmission are in a same cell or on a same carrier, a transmission resource of the first transmission overlaps a transmission resource of the second transmission, and a priority of the first transmission is higher than a priority of the second transmission;

the first transmission and the second transmission are in a same cell or on a same carrier, the first transmission and the second transmission are transmitted on different time domain resources in a same slot, reception or sending of more than one transmission in a same slot in a same cell or on a same carrier is not supported at a terminal side, and a priority of the first transmission is higher than a priority of the second transmission.

Optionally, in the user equipment, that the transmission resource of the first transmission overlaps the transmission resource of the second transmission includes at least one of following:

only time domain transmission resources overlap;

time domain transmission resources overlap and frequency domain transmission resources overlap;

time domain transmission resources overlap, frequency domain transmission resources do not overlap, and reception or sending of more than one transmission at a same time instant is not supported at the terminal side.

Optionally, in the user equipment, it is determined that the priority of the first transmission is higher than the priority of the second transmission when the relation between the first transmission and the second transmission satisfies at least one of following conditions:

a sending time of the first DCI is later than a sending time of a second DCI for scheduling the second transmission;

the second transmission is semi-statically configured transmission;

a transmission length of the first transmission is less than a transmission length of the second transmission;

it is determined that the priority of the first transmission is higher than the priority of the second transmission according to transmission parameters corresponding to the first transmission and the second transmission respectively.

Optionally, in the user equipment, the transmission parameters include at least one of following parameters:

DCI, a radio network temporary identifier (RNTI), a control resource set (CORESET), a search space, a target block error rate (BLER), a channel quality indicator (CQI), a modulation and coding scheme (MCS) table and a priority flag.

Optionally, in the user equipment, that, in the case that a relation between the first transmission and the scheduled or configured second transmission satisfies the preset condition, that the time instant of receiving the first DCI is not later than the time instant with the time duration T before the starting symbol of the second transmission includes:

a first symbol or a last symbol of the first DCI is not later than the time instant with the time duration T before the starting symbol of the second transmission; or, a first symbol or a last symbol of a CORESET where the first DCI is transmitted is not later than the time instant with the time duration T before the starting symbol of the second transmission; or, the first symbol or the last symbol of the first DCI is not later than a first symbol with the time duration T before the starting symbol of the second transmission; or, the first symbol or the last symbol of the CORESET where the first DCI is transmitted is not later than the first symbol with the time duration T before the starting symbol of the second transmission.

Optionally, in the user equipment, the time duration T includes T OFDM symbols or T time lengths.

Optionally, in the user equipment, the processor is further configured to:

abandon sending the second transmission when the first transmission and the second transmission are uplink transmission;

abandon receiving the second transmission when the first transmission and the second transmission are downlink transmission.

Optionally, in the user equipment, after the receiving the first DCI for scheduling the first transmission, the processor is further configured to:

determine that the first DCI is an erroneous scheduling if the time instant of receiving the first DCI is later than the time instant with the time duration T before the starting symbol of the second transmission, in the case that a relation between the first transmission and the scheduled or configured second transmission satisfies the preset condition.

An embodiment of the present disclosure further provides a data transmission apparatus, applied to a network side device, including:

a sending module, configured to send a first downlink control information (DCI) for scheduling a first transmission;

wherein in a case that a relation between the first transmission and scheduled or configured second transmission satisfies a preset condition, a time instant of sending the first DCI is not later than a time instant with a time duration T before a starting symbol of the second transmission.

An embodiment of the present disclosure further provides a data transmission apparatus, applied to user equipment, including:

a reception module, configured to receive a first downlink control information (DCI) for scheduling a first transmission;

wherein in a case that a relation between the first transmission and scheduled or configured second transmission satisfies a preset condition, a time instant of receiving the first DCI is not later than a time instant with a time duration T before a starting symbol of the second transmission.

An embodiment of the present disclosure further provides a computer readable storage medium storing therein a computer program, wherein the computer program is configured to be executed by a processor, to implement steps of any one of the foregoing data transmission methods.

The foregoing technical solution of the present disclosure at least has the following beneficial effects:

according to the data transmission method described in the embodiments of the present disclosure, in a case that a relation between the first transmission and scheduled or configured second transmission satisfies a preset condition, the first DCI for scheduling the first transmission is sent no later than a time instant with a time duration T before a starting symbol of the second transmission, thus solving the problem in the related art that a transmission failure may occur to overlaid data transmission when two transmission resources overlay each other, leading to waste of processing resources and power resources used in the preparation and sending of the data transmission.

BRIEF DESCRIPTION OF THE DRAWINGS

FIG. 3 is a flow diagram of a first implementation of the data transmission method according to some embodiments of the present disclosure;

FIG. 4 is a flow diagram of a second implementation of the data transmission method according to some embodiments of the present disclosure;

FIG. 5 is a schematic diagram of a frame structure when the data transmission method according to some embodiments of the present disclosure is adopted;

DETAILED DESCRIPTION

To describe a technical problem to be solved, technical solutions and advantages of the present disclosure more clearly, embodiments are described in detail hereinafter with reference to the accompanying drawings.

Figure 1:
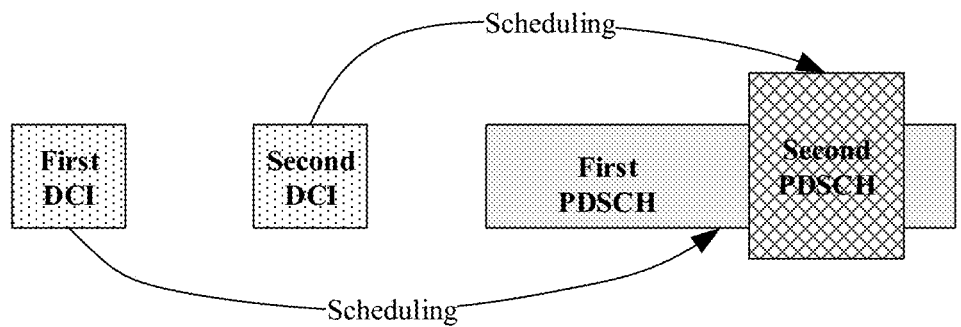
FIG. 1 is a schematic structural diagram of data transmission in the related art.
Figure 2:
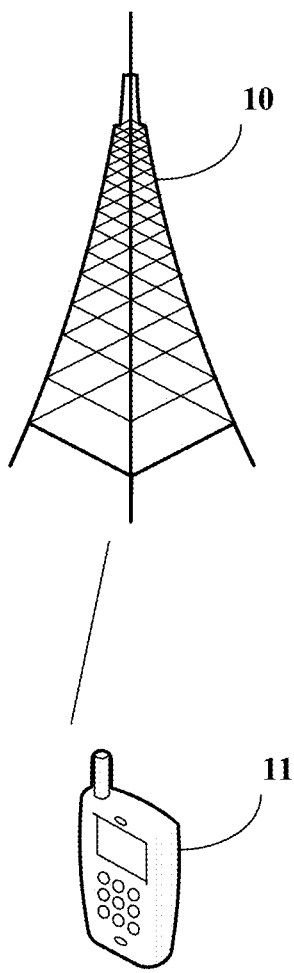
FIG. 2 is a schematic diagram of an architecture of a wireless communication system to which a data transmission method according to some embodiments of the present disclosure is applied.

The data transmission method, a network side device and user equipment described in the embodiments of the present disclosure may be applied to a wireless communication system. The wireless communication system may be a 5G system, an Evolved Long Term Evolution (eLTE) system, or a subsequent evolved communication system. Referring to FIG. 2, a schematic diagram of an architecture of a wireless communication system according to embodiments of the present disclosure is illustrated. As shown in FIG. 2, the wireless communication system may include: a network side device 10 and user equipment. For example, the user equipment is labeled as UE 11. The UE 11 may be connected to the network side device 10. In practical applications, the connections between the various devices may be wireless connections. For ease of illustrating connection relationship between various devices in an intuitive manner, the connection relationship is depicted with solid lines in FIG. 2.

It is noted, the communication system may include multiple UEs, and the network side device may communicate with the multiple UEs (for signaling transmission or data transmission).

The network side device 10 provided in the embodiments of the present disclosure may be a base station. The base station may be a commonly used base station, an evolved node base station (eNB), a network side device in a 5G system (e.g., next generation node base station (gNB)), a transmission and reception point (TRP), a cell or the like.

User equipment provided in the embodiments of the present disclosure may be a handset, a tablet computer, a notebook computer, an Ultra-Mobile Personal Computer (UMPC), a netbook, a Personal Digital Assistant (PDA) or the like.

Additionally, it is noted, the user equipment provided in the embodiments of the present disclosure may support multiple different types of services simultaneously, e.g., support the eMBB service and the URLLC service simultaneously, or may support services of the same service type, but with different priorities, simultaneously.

To solve the problem in the related art that a transmission failure may occur to overlaid data transmission when the overlaid data transmission occurs between two transmission resources, leading to waste of processing resources and power resources used in the preparation and sending of the data transmission, an embodiment of the present disclosure provides a data transmission method.

An implementation of the data transmission method according to some embodiments of the present disclosure is applied to a network side device, and, as shown in FIG. 3, the method includes:

S310, sending a first downlink control information (DCI) for scheduling a first transmission;

wherein in a case that a relation between the first transmission and scheduled or configured second transmission satisfies a preset condition, a time instant of sending the first DCI is not later than a time instant with a time duration T before a starting symbol of the second transmission.

Specifically, when the first transmission scheduled by the first downlink control information (DCI) conflicts with the scheduled or configured second transmission, the time instant of sending the first DCI is not later than a time instant with a time duration T before a starting symbol of the second transmission, such that enough time for processing and judgement is reserved for the terminal. For uplink transmission, before preparation of the data transmission corresponding to the second transmission begins, it may be judged that the first transmission with a higher priority conflicts with the second transmission, and as a result the data transmission corresponding to the second transmission cannot be performed, thus the preparation of data for the second transmission may be abandoned, to avoid waste of processing resources and power resources. For downlink transmission, before the preparation of reception of the second transmission begins, it may be judged that the first transmission with a higher priority conflicts with the second transmission, and as a result the data transmission corresponding to the second transmission cannot be received, thus the preparation for receiving the second transmission may be abandoned, to avoid waste of processing resources and power resources.

Optionally, in some embodiments of the present disclosure, the time duration T is at least greater than or equal to a preparation time of the second transmission, or is at least greater than or equal to a parsing time of the first DCI, or is greater than or equal to a sum of the parsing time of the first DCI and the preparation time of the second transmission.

Specifically, according the aforementioned design principle of the time duration T, a specific numerical value of the time duration T may be determined according to a pre-agreement or configuration, or may be calculated according to parameters corresponding to configuration information.

In some embodiments of the present disclosure, the time instant of sending the first DCI is not later than a time instant with a time duration T before a starting symbol of the second transmission. In other words, the first DCI is sent prior to the time instant with the time duration T before the starting symbol of the second transmission, or the first DCI is sent at the time instant with the time duration T before the starting symbol of the second transmission.

It is noted, when the second transmission is uplink transmission, the starting symbol of the second transmission is a starting symbol when the second transmission is received; when the second transmission is downlink transmission, the starting symbol of the second transmission is a starting symbol when the second transmission is sent.

In some embodiments of the present disclosure, the preset condition includes at least one of following:

the first transmission and the second transmission are in a same cell or on a same carrier, a transmission resource of the first transmission overlaps a transmission resource of the second transmission, and a priority of the first transmission is higher than a priority of the second transmission;

the first transmission and the second transmission are in a same cell or on a same carrier, the first transmission and the second transmission are transmitted on different time domain resources in a same slot, reception or sending of more than one transmission in a same slot in a same cell or on a same carrier is not supported at a terminal side, and a priority of the first transmission is higher than a priority of the second transmission.

In other words, specifically, in the case that it is determined the first transmission scheduled by the first DCI and the scheduled or configured second transmission satisfy any one of foregoing conditions when the first DCI is sent, it is determined that the first transmission conflicts with the second transmission, then the time instant of sending the first DCI is not later than a time instant with a time duration T before a starting symbol of the second transmission.

Optionally, as for the first condition among the foregoing preset conditions, a case that the transmission resource of the first transmission overlaps the transmission resource of the second transmission includes at least one of following cases;

only time domain transmission resources overlap;

time domain transmission resources overlap and frequency domain transmission resources overlap;

time domain transmission resources overlap, frequency domain transmission resources do not overlap, and reception or sending of more than one transmission at a same time instant is not supported at the terminal side.

It is noted, the overlapping includes both complete overlapping and partial overlapping.

Optionally, it is determined that the priority of the first transmission is higher than the priority of the second transmission when the relation between the first transmission and the second transmission satisfies at least one of following conditions:

a sending time of the first DCI is later than a sending time of a second DCI for scheduling the second transmission;

the second transmission is semi-statically configured transmission;

a transmission length of the first transmission is less than a transmission length of the second transmission;

it is determined that the priority of the first transmission is higher than the priority of the second transmission according to transmission parameters corresponding to the first transmission and the second transmission respectively.

Optionally, the transmission parameters include at least one of following parameters:

DCI, a Radio Network Temporary Identifier (RNTI), a control resource set (CORESET), a search space, a target Block Error Rate (BLER), a Channel Quality Indicator (CQI), a Modulation And Coding Scheme (MCS) table and a priority flag.

Specifically, the foregoing determining that the priority of the first transmission is higher than the priority of the second transmission according to transmission parameters corresponding to the first transmission and the second transmission respectively is exemplified as follows.

When the transmission parameter includes DCI, the first transmission corresponds to a first DCI format, the second transmission corresponds to a second DCI format, it is predefined that when any one of the preset conditions is satisfied, the transmission scheduled by the first DCI format overlays the transmission scheduled by the second DCI format, then the priority of the transmission scheduled by the first DCI format is higher than the priority of the transmission scheduled by the second DCI format.

When the transmission parameter includes RNTI, the first transmission corresponds to a first RNTI, the second transmission corresponds to a second RNTI, it is predefined that when any one of the preset conditions is satisfied, the transmission using the first RNTI overlays the transmission using the second RNTI, then the priority of the transmission using the first RNTI is higher than the priority of the transmission using the second RNTI.

When the transmission parameter includes CORESET or the search space, the first transmission corresponds to DCI transmitted in the first CORESET/search space, the second transmission corresponds to DCI transmitted in the second CORESET/search space, it is predefined that when any one of the preset conditions is satisfied, the transmission scheduled by the DCI transmitted in the first CORESET/search space overlays the transmission scheduled by the DCI transmitted in the second CORESET/search space, then the priority of the transmission scheduled by the DCI transmitted in the first CORESET/search space is higher than the priority of the transmission scheduled by the DCI transmitted in the second CORESET/search space.

When the transmission parameter includes BLER, the first transmission corresponds to a target BLER of $10^5$ or $10^6$, the second transmission corresponds to a target BLER higher than $10^{-5}$ or $10^{-6}$ (e.g., $10^{-2}$ or $10^{-1}$), it is predefined that when any one of the preset conditions is satisfied, the first transmission overlays the second transmission, then the priority of the first transmission is higher than the priority of the second transmission.

When the transmission parameter includes a CQI table or an MCS table, the first transmission corresponds to a URLLC CQI table (or a corresponding URLLC MCS table), the second transmission corresponds to a 64 QAM/256 QAM CQI table (or a corresponding 64 QAM/256 QAM MCS table), it is predefined that when any one of the preset conditions is satisfied, the first transmission overlays the second transmission, then the priority of the first transmission is higher than the priority of the second transmission.

In the data transmission method according to some embodiments of the present disclosure, in the step S310, that the time instant of sending the first DCI is not later than a time instant with a time duration T before a starting symbol of the second transmission includes:

a first symbol or a last symbol of the first DCI is not later than the time instant with the time duration T before the starting symbol of the second transmission; or, a first symbol or a last symbol of a CORESET where the first DCI is transmitted is not later than the time instant with the time duration T before the starting symbol of the second transmission; or, the first symbol or the last symbol of the first DCI is not later than a first symbol with the time duration T before the starting symbol of the second transmission; or, the first symbol or the last symbol of the CORESET where the first DCI is transmitted is not later than the first symbol with the time duration T before the starting symbol of the second transmission.

Optionally, the time duration T includes or consists of T OFDM symbols or T time lengths.

The first DCI is sent in the aforementioned manner, so that the time instant of sending the first DCI is not later than a time instant with a time duration T before a starting symbol of the second transmission, to reserve enough time for the terminal to perform processing and judgement. Before the preparation of the data transmission corresponding to the second transmission begins, when it is judged that the first transmission with a higher priority conflicts with the second transmission, data preparation corresponding to the second transmission is abandoned, to avoid waste of processing resources and power resources.

After the step S310, the data transmission method according to some embodiments of the present disclosure further includes:

abandoning receiving the second transmission when the first transmission and the second transmission are uplink transmission;

abandoning sending the second transmission when the first transmission and the second transmission are downlink transmission.

Based on the aforementioned manner, when two transmission resources overlay each other and a priority of the first transmission is higher than a priority of the second transmission, after the first DCI for scheduling the first transmission is sent at a time instant with a time duration T before a starting symbol of the second transmission, or after the first DCI is sent prior to a time instant with a time duration T before a starting symbol of the second transmission, the reception of the second transmission which is uplink transmission may be abandoned, and the sending of the second transmission which is downlink transmission may be abandoned, to avoid waste of processing resources.

In the data transmission method according to some embodiments of the present disclosure, when the first transmission overlays the second transmission, the first DCI for scheduling the first transmission is sent at a time no later than a time T before a starting symbol of the second transmission, to avoid the problem that processing resources and power resources may be wasted if the second transmission, which has a great probability of encountering a transmission failure since the second transmission is overlaid, is prepared and sent.

Another implementation of the data transmission method according to some embodiments of the present disclosure is applied to user equipment, and, as shown in FIG. 4, the method includes:

S410, receiving a first downlink control information (DCI) for scheduling a first transmission;

wherein in a case that a relation between the first transmission and scheduled or configured second transmission satisfies a preset condition, a time instant of receiving the first DCI is not later than a time instant with a time duration T before a starting symbol of the second transmission.

In the data transmission method according to some embodiments of the present disclosure, when the first DCI for scheduling first transmission is received, and the scheduled first transmission conflicts with scheduled or configured second transmission, it is determined that a time instant of receiving the first DCI is not later than a time instant with a time duration T before a starting symbol of the second transmission, such that enough time for processing and judgement is reserved for the terminal. For uplink transmission, before preparation of data transmission corresponding to the second transmission begins, it may be judged that the first transmission with a higher priority conflicts with the second transmission, and as a result the data transmission corresponding to the second transmission cannot be performed, thus data preparation corresponding to the second transmission may be abandoned, to avoid waste of processing resources and power resources. For downlink transmission, before preparation of reception of the second transmission begins, it may be judged that the first transmission with a higher priority conflicts with the second transmission, and as a result the data transmission corresponding to the second transmission cannot be received, thus preparation for receiving the second transmission may be abandoned, to avoid waste of processing resources and power resources.

Optionally, in some embodiments of the present disclosure, the time duration T is at least greater than or equal to a data preparation time of the second transmission, or is at least greater than or equal to a parsing time of the first DCI, or is greater than or equal to a sum of the parsing time of the first DCI and the data preparation time of the second transmission.

Specifically, according the aforementioned design principle of the time duration T, a specific numerical value of the time duration T may be determined according to a pre-agreement or configuration, or may be calculated according to parameters corresponding to configuration information.

In some embodiments of the present disclosure, a time instant of receiving the first DCI is not later than a time instant with a time duration T before a starting symbol of the second transmission. In other words, the network side device sends the first DCI prior to the time instant with the time duration T before a starting symbol of the second transmission, or sends the first DCI at the time instant with the time duration T before the starting symbol of the second transmission.

In some embodiments of the present disclosure, the preset condition includes at least one of following conditions:

the first transmission and the second transmission are in a same cell or on a same carrier, a transmission resource of the first transmission overlaps a transmission resource of the second transmission, and a priority of the first transmission is higher than a priority of the second transmission;

the first transmission and the second transmission are in a same cell or on a same carrier, the first transmission and the second transmission are transmitted on different time domain resources in a same slot, reception or sending of more than one transmission in a same slot in a same cell or on a same carrier is not supported at a terminal side, and a priority of the first transmission is higher than a priority of the second transmission.

Optionally, that the transmission resource of the first transmission overlaps the transmission resource of the second transmission includes at least one of following conditions:

only time domain resources overlap;

time domain resources overlap and frequency domain resources overlap;

time domain resources overlap, frequency domain resources do not overlap, and reception or sending of more than one transmission at a same time instant is not supported at the terminal side.

It is noted, the overlapping includes both complete overlapping and partial overlapping.

Optionally, it is determined that the priority of the first transmission is higher than the priority of the second transmission when the relation between the first transmission and the second transmission satisfies at least one of following conditions:

a sending time of the first DCI is later than a sending time of a second DCI for scheduling the second transmission;

the second transmission is semi-statically configured transmission;

a transmission length of the first transmission is less than a transmission length of the second transmission;

it is determined that the priority of the first transmission is higher than the priority of the second transmission according to transmission parameters corresponding to the first transmission and the second transmission respectively.

Optionally, the transmission parameters include at least one of following parameters:

DCI, a radio network temporary identifier (RNTI), a control resource set (CORESET), a search space, a target block error rate (BLER), a channel quality indicator (CQI), a modulation and coding scheme (MCS) table and a priority flag.

Optionally, that a time instant of receiving the first DCI is not later than the time instant with the time duration T before the starting symbol of the second transmission includes:

a first symbol or a last symbol of the first DCI is not later than the time instant with the time duration T before the starting symbol of the second transmission; or, a first symbol or a last symbol of a CORESET where the first DCI is transmitted is not later than the time instant with the time duration T before the starting symbol of the second transmission; or, the first symbol or the last symbol of the first DCI is not later than a first symbol with the time duration T before the starting symbol of the second transmission; or, the first symbol or the last symbol of the CORESET where the first DCI is transmitted is not later than the first symbol with the time duration T before the starting symbol of the second transmission.

Optionally, the time duration T includes T OFDM symbols or T time lengths.

In some embodiments of the present disclosure, the method further includes:

abandoning sending the second transmission when the first transmission and the second transmission are uplink transmission;

abandoning receiving the second transmission when the first transmission and the second transmission are downlink transmission.

Based on the aforementioned manner, after the user equipment receives the first DCI for scheduling the first transmission, and when it is determined that the relation between the first transmission and scheduled or configured second transmission satisfies a preset condition, and the first DCI is received at a time instant no later than a time instant with a time duration T before a starting symbol of the second transmission, the sending of the second transmission which is uplink transmission may be abandoned, and the reception of the second transmission which is downlink transmission may be abandoned, to avoid waste of processing resources.

Optionally, in some embodiments of the present disclosure, in the step S410, after the receiving the first DCI for scheduling the first transmission, the method further includes:

determining that the first DCI is an erroneous scheduling if the first DCI is received at a time instant later than the time instant with the time duration T before the starting symbol of the second transmission in the case that the relation between the first transmission and the scheduled or configured second transmission satisfies the preset condition.

Further, when the first transmission and the second transmission are uplink transmission, after it is determined that the first DCI is an erroneous scheduling, the method further includes:

selecting one of the first transmission and the second transmission for uplink transmission; or, abandoning sending the first transmission and the second transmission.

Optionally, when the first transmission and the second transmission are downlink transmission, after it is determined that the first DCI is an erroneous scheduling, the method further includes:

selecting one of the first transmission and the second transmission for reception; or, abandoning receiving the first transmission and the second transmission.

According to the data transmission method of some embodiments of the present disclosure, when the user equipment receives the first DCI for scheduling the first transmission, and determines that the first transmission has a resource conflict with scheduled or configured second transmission, and a priority of the first transmission is higher than a priority of the second transmission, it is necessary to further determine whether the first DCI is received at a time instant later than the time instant with the time duration T before the starting symbol of the second transmission; when the first DCI is received at a time instant not later than the time instant with the time duration T before the starting symbol of the second transmission, the sending of the second transmission which is uplink transmission may be abandoned, and the reception of the second transmission which is downlink transmission may be abandoned, to avoid waste of processing resources; when the first DCI is received at a time instant later than the time instant with the time duration T before the starting symbol of the second transmission, the user equipment may determine that the scheduling by the first DCI is an erroneous scheduling. The processing behavior of the user equipment may not be regulated, and the user equipment selects one of the first transmission and the second transmission to perform data transmission processing, or performs data transmission processing for neither of the first transmission and the second transmission.

In the data transmission method according to some embodiments of the present disclosure, when the first transmission overlays the second transmission, the first DCI for scheduling the first transmission is sent at a time instant no later than a time T before a starting symbol of the second transmission, to avoid the problem that processing resources and power resources may be wasted if the second transmission, which has a great probability of encountering a transmission failure since the second transmission is overlaid, is prepared and sent.

The specific implementations of the data transmission method according to some embodiments of the present disclosure, when applied to the network side device and user equipment respectively, are exemplified hereinafter with reference to FIG. 5. The network side device is a base station, and the user equipment is a terminal.

Taking uplink transmission for example, it is assumed that the first DCI may be used for scheduling of a URLLC service, the second DCI may be used for scheduling of an eMBB service (or, other information such as CORESET/search space/RNTI/DCI format/BLER/CQI/MCS table configurations may be used to differentiate different services, or different transmission priorities), and the URLLC service has a priority higher than that of the eMBB service; additionally, the specific value of the time duration T may be pre-agreed, configured or calculated.

When uplink transmission is performed according to the foregoing configurations, referring to FIG. 5, on the base station side:

The base station sends a second DCI at a second DCI monitoring occasion in the slot n−1, wherein the second DCI is used for scheduling a terminal to transmit a second PUSCH on the first to $14^{th}$ symbols of the slot n.

After the second DCI is sent, an uplink service with a higher priority arrives. The base station determines that a first DCI for scheduling a first PUSCH needs to be sent, and due to stringent latency requirement of the first PUSCH, the first PUSCH needs to transmitted on resources overlapping with those for the second PUSCH, e.g., the third to $13^{th}$ symbols of the slot n (certainly, if there is shortage in frequency domain resources, the overlapping may also occur with respect to the frequency domain resources). Then the base station selects, for sending the first DCI, a time domain position satisfying the time duration T in the slot n−1, wherein the first DCI is used for scheduling the terminal to transmit the first PUSCH on the third to $13^{th}$ symbols of the slot n. For example, the first DCI is sent at one first DCI monitoring occasion in slot n−1 as shown in FIG. 5, wherein the ending OFDM symbol of the first DCI is not later than a time T before a starting OFDM symbol of the second PUSCH (or, not later than a first OFDM symbol with the time duration T before the starting OFDM symbol of the second PUSCH); of course, other manners of definition are also possible, such as, the last OFDM symbol of the CORESET where the first DCI is located is not later than the time duration T before the starting OFDM symbol of the second PUSCH (or, not later than a first OFDM symbol with the time duration T before the starting OFDM symbol of the second PUSCH), and a detailed description thereof is omitted since they have similar specific behaviors. For example, T at least includes a preparation time of the second PUSCH, or T further includes a parsing time of the first DCI. In this way, enough time for processing and judgement is reserved for the terminal, so that before the preparation of the second PUSCH begins, the terminal may judges that the resource of the first PUSCH with a higher priority conflicts with the resource of the second PUSCH, and as a result, the second PUSCH cannot be sent, thus it may be judged, before the preparation of the second PUSCH begins, that the second PUSCH needs not be sent and the data preparation of the second PUSCH is not necessary, to avoid the terminal's processing power and energy consumption from being wasted as a result of preparing and sending the PUSCH.

The base station determines that the terminal merely transmits the first PUSCH on the third to $13^{th}$ symbols of the slot n and does not transmit the second PUSCH, that is, the base station only needs to receive the first PUSCH on the third to $13^{th}$ symbols of the slot n; in this way, the reception of the second PUSCH, which has a low chance of being received successfully since a large range of resources thereof are occupied, can be avoided to conserve receiving power. Further, the base station may opt to directly reschedule the second PUSCH at a subsequent second DCI monitoring occasion.

On the terminal side:

The terminal monitors the first DCI and the second DCI at the first DCI monitoring occasion and the second DCI monitoring occasion respectively.

First, the terminal receives the second DCI at one second DCI monitoring occasion in the slot n−1, and based on a parsing of the second DCI, determines that the second PUSCH needs to be transmitted on the first to $14^{th}$ symbols of the slot n.

Then, the terminal does not expect to receive the first DCI not satisfying the time duration T requirement, that is, when the terminal determines that one second PUSCH transmission is present, the terminal does not expect to receive the first DCI sent at a time instant later than the time duration T before the starting symbol of the second PUSCH.

For example, one implementation is as follows: the terminal detects the first DCI at each first DCI monitoring occasion in the slot n−1, and after the first DCI is received, based on a parsing of the first DCI, the terminal determines that the first PUSCH needs to be transmitted on the third to $13^{th}$ symbols of the slot n; since the first PUSCH has a priority higher than that of the second PUSCH and the resource of the first PUSCH overlaps the resource of the second PUSCH, the terminal needs to further judge whether the transmission position of the first DCI satisfies the time duration T requirement, that is, to determine that the ending OFDM symbol of the first DCI is not later than time duration T before a starting OFDM symbol of the second PUSCH (or, not later than a first OFDM symbol with the time duration T before the starting OFDM symbol of the second PUSCH); of course, other manners of definition are also possible, such as, the last OFDM symbol of the CORESET where the first DCI is located is not later than the time duration T before the starting OFDM symbol of the second PUSCH (or, not later than a first OFDM symbol with the time duration T before the starting OFDM symbol of the second PUSCH), and a detailed description thereof is omitted since they have similar specific behaviors; when the terminal determines that the received first DCI satisfies the above condition, and determines, according to the scheduling information of the first DCI, that the first PUSCH overlaps the second PUSCH, the terminal does not begin to prepare for the second PUSCH yet, then the terminal may determines, before beginning to prepare the data transmission of the second PUSCH, that the second PUSCH does not need to be transmitted, that is, the second PUSCH is replaced with the first PUSCH; as a result, the terminal determines that, in the slot n, only the first PUSCH is to be transmitted on the third to $13^{th}$ symbols, and the second PUSCH is not prepared and transmitted, thus, the terminal's processing resource and power resource used in the preparation and transmission of the second PUSCH are conserved. If the terminal has received the first DCI not satisfying the above T time requirement, e.g., the terminal receives the first DCI at the last first DCI monitoring occasion of the slot n−1, and if the first DCI schedules the terminal to transmit the first PUSCH at a positon in the slot n that overlaps the symbol of the second PUSCH, the terminal determines that this scheduling is an erroneous scheduling made by the base station, in this case, the behavior of the terminal is not regulated, that is, the terminal may arbitrarily select one of the PUSCHs to transmit or do not transmit any of the PUSCHs. The reason is: the terminal cannot judge, before the preparation of the second PUSCH begins, that the first PUSCH with a higher priority overlaps the second PUSCH; therefore, if, until the preparation of the second PUSCH or even transmission of the second PUSCH has begun, the terminal judges that the first PUSCH with a higher priority overlaps the second PUSCH and stops the preparation or transmission of the second PUSCH, then the processing resource and power consumption spent on the preparation and transmission of the second PUSCH would have already been wasted, and thus this is an undesirable scheduling manner.

Another implementation is as follows: the terminal may detect the first DCI at a first DCI monitoring occasion of the slot n−1 that satisfies the T time requirement, that is, the terminal detects the first DCI at the first DCI monitoring occasion before the last first DCI monitoring occasion in the slot n−1 as shown in FIG. 5. Having received the first DCI, the terminal determines, according to a parsing of the first DCI, that the first PUSCH needs to be transmitted on the third to $13^{th}$ symbols in the slot n and overlaps the resources of the second PUSCH. At this time, it is obvious that the first DCI satisfies the time duration T requirement, then the terminal may directly determine that, in the slot n, only the first PUSCH is to be transmitted on the third to $13^{th}$ symbols, and the second PUSCH is not prepared and transmitted, thus, the terminal's processing resource and power resource used in the preparation and transmission of the second PUSCH are conserved.

In embodiments of the present disclosure, the time duration T may be in units of symbols, for example, a numerical value of the time duration T may be one of following parameters:

$N_2$; $N_2+A$, wherein A is a predetermined quantity of symbols processed for DCI parsing; $N_2+N$; $N_2+d_{2,1}+1$; $N_2+d_{2,1}$; $Z+d$; a maximum value of $(N_2+d_{2,1}+1)$ and $d_{2,2}$; a maximum value of $(N_2 d_{2,1})$ and $d_{2,2}$; a maximum value of $(Z+d)$ and $d_{2,2}$; or the like, wherein, for example, $N_2$ is a PUSCH processing latency related to a subcarrier spacing and a terminal capability; N is a minimal time difference between a DCI requiring HARQ-ACK feedback and the HARQ-ACK feedback, namely, the processing latency for a DCI requiring HARQ-ACK feedback (including the latency for preparing its HARQ-ACK transmission); u is an index of reference subcarrier spacing (e.g., defined as a minimal subcarrier spacing among multiple channels, or the like); $d_{2,1}$ is a latency parameter related to DMRS configuration of PUSCH, e.g., if the first symbol of the PUSCH includes only DMRS, then $d_{2,1}=0$, otherwise, $d_{2,1}=1$; $d_{2,2}$ is a latency parameter related to BWP switching, e.g., if a UL grant corresponding to the current PUSCH triggers BWP switching, then $d_{2,2}$ is the predetermined time required for BWP switching, otherwise, $d_{2,2}=0$; $T_c$ is an elemental time unit (a sampling time interval) in NR and is a predetermined value; κ is a ratio between an elemental time unit in LTE and the elemental time unit in NR, and is a predetermined fixed value; Z is a latency related to A-CSI; d is a quantity of symbols where PDCCH and scheduled PDSCH overlap; for specific meanings of the above parameters, references may be made to definitions in communication technical standards TS38.211 and TS38.214.

Optionally, the numerical value of the time duration T may be a numerical value in units of time lengths (for example, milliseconds), and may specifically be one of following parameters:

$(N_2)\cdot(2048+144)\cdot\kappa\cdot 2^{-\mu}\cdot T_C$;

$(N_2+d_{2,1})\cdot(2048+144)\cdot\kappa\cdot 2^{-\mu}\cdot T_C$;

$(N_2+d_{2,1}+1)\cdot(2048+144)\cdot\kappa\cdot 2^{-\mu}\cdot T_C$;

$(Z+d)\cdot(2048+144)\cdot\kappa\cdot 2^{-\mu}\cdot T_C$;

$\max((N_2)\cdot(2048+144)\cdot\kappa\cdot 2^{-\mu}\cdot T_C, d_{2,2})$;

$\max((N_2+d_{2,1})\cdot(2048+144)\cdot\kappa\cdot 2^{-\mu}\cdot T_C, d_{2,2})$;

$\max((N_2+d_{2,1}+1)\cdot(2048+144)\cdot\kappa\cdot 2^{-\mu}\cdot T_C, d_{2,2})$;

$\max((Z+d)\cdot(2048+144)\cdot\kappa\cdot 2^{-\mu}\cdot T_C, d_{2,2})$; or the like;

wherein, for specific meanings of the above parameters, references may be made to communication standards well known to those skilled in the art, and detailed descriptions thereof are omitted herein.

It is appreciated, in the foregoing embodiments, the same is applicable to a case where the second PUSCH is replaced with a PUSCH without corresponding DCI scheduling, i.e., grant-free PUSCH.

In the foregoing embodiments, a mode of operation same as the aforementioned can be utilized when the first PUSCH and the second PUSCH do not overlap in terms of frequency domain resources, but overlap in terms of time domain resources.

In the foregoing embodiments, when the first PUSCH and the second PUSCH do not overlap in terms of frequency domain resources, but overlap in terms of time domain resource, and if simultaneous sending of more than one PUSCH at the same time instant on the same carrier/in the same cell is not supported at the terminal side, a mode of operation same as the aforementioned can be utilized; if the simultaneous sending of more than one PUSCH at the same time instant on the same carrier/in the same cell is supported at the terminal side, the first PUSCH and the second PUSCH may be sent simultaneously.

In the foregoing embodiments, when the first PUSCH and the second PUSCH are in the same slot and do not overlap in terms of time domain resources, and if the sending of more than one PUSCH in the same slot on the same carrier/in the same cell is supported at the terminal side, a mode of operation same as the aforementioned can be utilized; if the sending of more than one PUSCH in the same slot on the same carrier/in the same cell is supported at the terminal side, the first PUSCH and the second PUSCH may be sent in a time division multiplexing (TDM) manner.

In the foregoing embodiments, if the first PUSCH and the second PUSCH are replaced with PDSCHs, the same operation is applicable, and the only difference between the case of PUSCH and the case of PDSCH is that: the UE receives the PDSCH, and the base station sends the PDSCH. Particularly, for the second PDSCH, the terminal may determine that no Hybrid Automatic Repeat reQuest (HARQ)-acknowledgement (ACK) feedback to the second PDSCH is given, or a Negative Acknowledgement (NACK) is always used as feedback thereto; the base station may receive the HARQ-ACK in the same manner.

Particularly, at this time, the time duration T may only include parsing time of the first DCI, therefore the length of the time duration T may be less than the time duration T in uplink direction; for example, A is a predetermined quantity of symbols processed for DCI parsing, or N, or $(N)\cdot(2048+144)\cdot\kappa\cdot 2^{-\mu}\cdot T_C$, or $(N+1)\cdot(2048+144)\cdot\kappa\cdot 2^{-\mu}\cdot T_C$, or the like.

Figure 6:
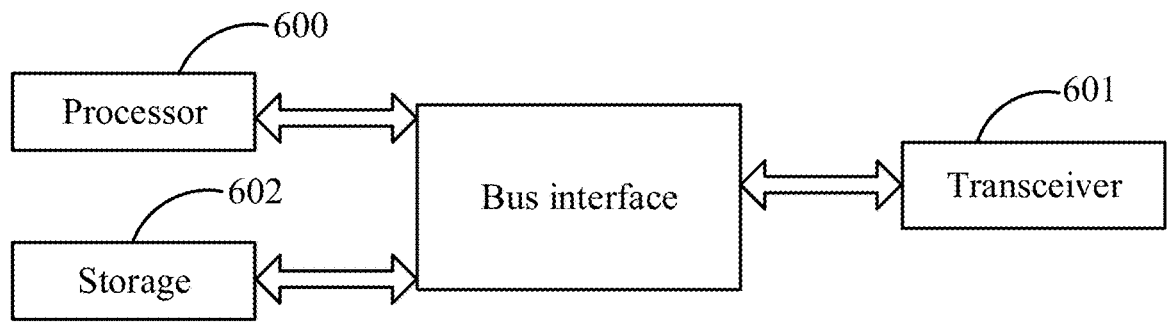
FIG. 6 is a schematic structural diagram of a network side device according to some embodiments of the present disclosure.

As shown in FIG. 6, some embodiments of the present disclosure further provide a network side device. The network side device includes a transceiver 601, a storage 602, a processor 600 and a program stored in the storage 602 and executable by the processor 600, wherein the processor 600 is configured to call and execute the program and data stored in the storage 602.

The transceiver 601 receives and sends data under the control of the processor 600. Specifically, the processor 600 is configured to read the program in the storage 602 to implement following process:

sending a first downlink control information (DCI) for scheduling a first transmission;

wherein in a case that a relation between the first transmission and scheduled or configured second transmission satisfies a preset condition, the time instant of sending the first DCI is not later than a time instant with a time duration T before a starting symbol of the second transmission.

Optionally, the preset condition includes at least one of following conditions:

the first transmission and the second transmission are in a same cell or on a same carrier, a transmission resource of the first transmission overlaps a transmission resource of the second transmission, and a priority of the first transmission is higher than a priority of the second transmission;

the first transmission and the second transmission are in a same cell or on a same carrier, the first transmission and the second transmission are transmitted on different time domain resources in a same slot, reception or sending of more than one transmission in a same slot in a same cell or on a same carrier is not supported at a terminal side, and a priority of the first transmission is higher than a priority of the second transmission.

Optionally, that the transmission resource of the first transmission overlaps the transmission resource of the second transmission includes at least one of following:

only time domain transmission resources overlap;

time domain transmission resources overlap and frequency domain transmission resources overlap;

time domain transmission resources overlap, frequency domain transmission resources do not overlap, and reception or sending of more than one transmission at a same time instant is not supported at the terminal side.

Optionally, it is determined that the priority of the first transmission is higher than the priority of the second transmission when the relation between the first transmission and the second transmission satisfies at least one of following conditions:

a sending time of the first DCI is later than a sending time of a second DCI for scheduling the second transmission;

the second transmission is semi-statically configured transmission;

a transmission length of the first transmission is less than a transmission length of the second transmission;

it is determined that the priority of the first transmission is higher than the priority of the second transmission according to transmission parameters corresponding to the first transmission and the second transmission respectively.

Optionally, the transmission parameters include at least one of following parameters:

DCI, a radio network temporary identifier (RNTI), a control resource set (CORESET), a search space, a target block error rate (BLER), a channel quality indicator (CQI), a modulation and coding scheme (MCS) table and a priority flag.

Optionally, that the time instant of sending the first DCI is not later than the time instant with the time duration T before the starting symbol of the second transmission includes:

a first symbol or a last symbol of the first DCI is not later than the time instant with the time duration T before the starting symbol of the second transmission; or, a first symbol or a last symbol of a CORESET where the first DCI is transmitted is not later than the time instant with the time duration T before the starting symbol of the second transmission; or, the first symbol or the last symbol of the first DCI is not later than a first symbol with the time duration T before the starting symbol of the second transmission; or, the first symbol or the last symbol of the CORESET where the first DCI is transmitted is not later than the first symbol with the time duration T before the starting symbol of the second transmission.

Optionally, the time duration T includes T OFDM symbols or T time lengths.

Optionally, the processor 600 is further configured to:

abandon receiving the second transmission when the first transmission and the second transmission are uplink transmission;

abandon sending the second transmission when the first transmission and the second transmission are downlink transmission.

In FIG. 6, a bus architecture may include any number of interconnected buses and bridges, and connects various circuits including one or more processors represented by the processor 600 and a storage represented by the storage 602. The bus architecture may also connect various other circuits such as peripherals, voltage regulators and power management circuits, which are well known in the art. Therefore, a detailed description thereof is omitted herein. A bus interface provides an interface. The transceiver 601 may be multiple elements, such as a transmitter and a receiver, to allow for communication with various other apparatuses on the transmission medium. The processor 600 is responsible for supervising the bus architecture and normal processing and the storage 602 may store the data being used by the processor 600 during operation.

It is understood by those skilled in the art that all or a part of the steps of the aforementioned embodiments may be implemented through hardware, or through a program configured to instruct relevant hardware, wherein the program includes instructions configured to perform a part or all of the steps of the aforementioned method. The program may be stored in a readable storage medium, and the storage medium may be any form of storage medium.

Figure 7:
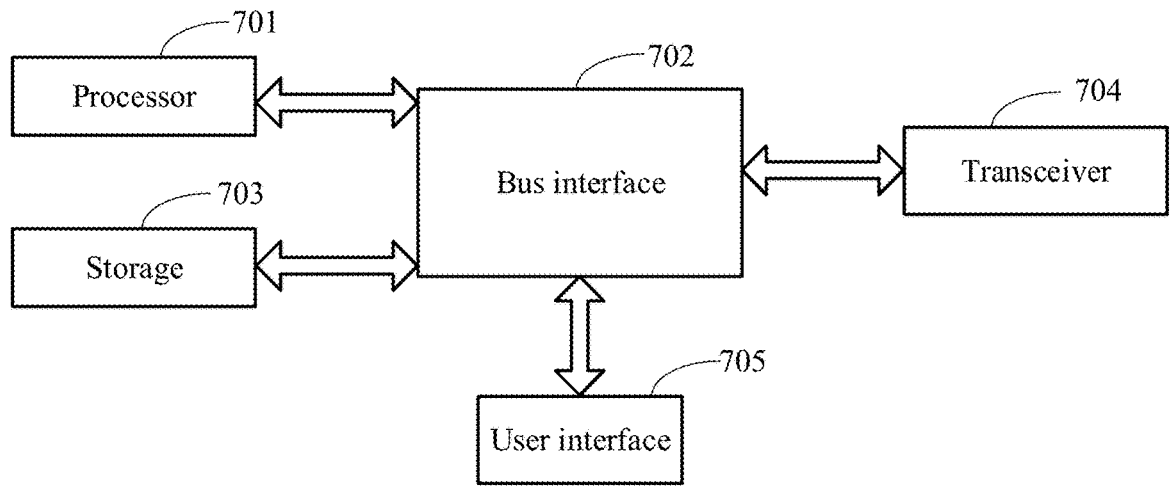
FIG. 7 is a schematic structural diagram of user equipment according to some embodiments of the present disclosure.

As shown in FIG. 7, some embodiments of the present disclosure further provide a terminal. The terminal includes: a processor 701, and a storage 703 connected to the processor 701 through a bus interface 702, wherein the storage 703 is configured to store the program and data being used by the processor 701 during operation, and the processor 701 is configured to call and execute the program and data stored in the storage 703.

A transceiver 704 is connected to the bus interface 702, and is configured to receive and send data under the control of the processor 701. Specifically, the processor 701 is configured to read the program in the storage 703 to implement the following process:

receiving a first downlink control information (DCI) for scheduling a first transmission;

wherein in a case that a relation between the first transmission and scheduled or configured second transmission satisfies a preset condition, a time instant of receiving the first DCI is not later than a time instant with a time duration T before a starting symbol of the second transmission.

Optionally, the preset condition includes at least one of following conditions:

the first transmission and the second transmission are in a same cell or on a same carrier, a transmission resource of the first transmission overlaps a transmission resource of the second transmission, and a priority of the first transmission is higher than a priority of the second transmission;

the first transmission and the second transmission are in a same cell or on a same carrier, the first transmission and the second transmission are transmitted on different time domain resources in a same slot, reception or sending of more than one transmission in a same slot in a same cell or on a same carrier is not supported at a terminal side, and a priority of the first transmission is higher than a priority of the second transmission.

Optionally, that the transmission resource of the first transmission overlaps the transmission resource of the second transmission includes at least one of following:

only time domain transmission resources overlap;

time domain transmission resources overlap and frequency domain transmission resources overlap;

time domain transmission resources overlap, frequency domain transmission resources do not overlap, and reception or sending of more than one transmission at a same time instant is not supported at the terminal side.

Optionally, it is determined that the priority of the first transmission is higher than the priority of the second transmission when the relation between the first transmission and the second transmission satisfies at least one of following conditions:

a sending time of the first DCI is later than a sending time of a second DCI for scheduling the second transmission;

the second transmission is semi-statically configured transmission;

a transmission length of the first transmission is less than a transmission length of the second transmission;

it is determined that the priority of the first transmission is higher than the priority of the second transmission according to transmission parameters corresponding to the first transmission and the second transmission respectively.

Optionally, the transmission parameters include at least one of following parameters:

a DCI, a radio network temporary identifier (RNTI), a control resource set (CORESET), a search space, a target block error rate (BLER), a channel quality indicator (CQI), a modulation and coding scheme (MCS) table and a priority flag.

Optionally, in the case that the relation between the first transmission and the scheduled or configured second transmission satisfies the preset condition, that the first DCI is received at a time instant not later than the time instant with the time duration T before the starting symbol of the second transmission includes:

a first symbol or a last symbol of the first DCI is not later than the time instant with the time duration T before the starting symbol of the second transmission; or, a first symbol or a last symbol of a CORESET where the first DCI is transmitted is not later than the time instant with the time duration T before the starting symbol of the second transmission; or, the first symbol or the last symbol of the first DCI is not later than a first symbol with the time duration T before the starting symbol of the second transmission; or, the first symbol or the last symbol of the CORESET where the first DCI is transmitted is not later than the first symbol with the time duration T before the starting symbol of the second transmission.

Optionally, the time duration T includes T OFDM symbols or T time lengths.

Optionally, the processor 701 is further configured to:

abandon sending the second transmission when the first transmission and the second transmission are uplink transmission;

abandon receiving the second transmission when the first transmission and the second transmission are downlink transmission.

Optionally, after the receiving the first DCI for scheduling the first transmission, the processor 701 is further configured to:

determine that the first DCI is an erroneous scheduling if the first DCI is received at a time instant later than the time instant with the time duration T before the starting symbol of the second transmission, in the case that the relation between the first transmission and the scheduled or configured second transmission satisfies the preset condition.

It is noted, in FIG. 7, a bus architecture may include any number of interconnected buses and bridges, and connects various circuits including one or more processors represented by the processor 701 and a storage represented by the storage 703. The bus architecture may also connect various other circuits such as peripherals, voltage regulators and power management circuits, which are well known in the art. Therefore, a detailed description thereof is omitted herein. A bus interface provides an interface. The transceiver 704 may be multiple elements, such as a transmitter and a receiver, to allow for communication with various other apparatuses on the transmission medium. For different terminals, a user interface 705 may be an interface capable of externally or internally connecting a required device, and the connected device includes, but is not limited to: a keypad, a display, a speaker, a microphone, a joystick and the like. The processor 701 is responsible for supervising the bus architecture and normal processing and the storage 703 may store the data being used by the processor 701 during operation.

It is understood by those skilled in the art that all or a part of the steps of the aforementioned embodiments may be implemented through hardware, or through a program configured to instruct relevant hardware, wherein the program includes instructions configured to perform a part or all of the steps of the aforementioned method. The program may be stored in a readable storage medium, and the storage medium may be any form of storage medium.

Figure 8:
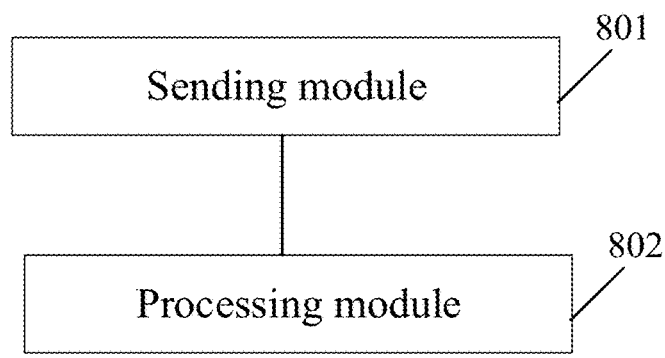
FIG. 8 is a schematic structural diagram of an implementation of a data transmission apparatus according to some embodiments of the present disclosure.

Some embodiments of the present disclosure further provide a data transmission apparatus applied to a network side device. As shown in FIG. 8, the apparatus includes:

a sending module 801, configured to send a first downlink control information (DCI) for scheduling a first transmission;

wherein in a case that a relation between the first transmission and scheduled or configured second transmission satisfies a preset condition, the time instant of sending the first DCI is not later than a time instant with a time duration T before a starting symbol of the second transmission.

Optionally, the preset condition includes at least one of following conditions:

the first transmission and the second transmission are in a same cell or on a same carrier, a transmission resource of the first transmission overlaps a transmission resource of the second transmission, and a priority of the first transmission is higher than a priority of the second transmission;

the first transmission and the second transmission are in a same cell or on a same carrier, the first transmission and the second transmission are transmitted on different time domain resources in a same slot, reception or sending of more than one transmission in a same slot in a same cell or on a same carrier is not supported at a terminal side, and a priority of the first transmission is higher than a priority of the second transmission.

Optionally, that the transmission resource of the first transmission overlaps the transmission resource of the second transmission includes at least one of following:

only time domain transmission resources overlap;

time domain transmission resources overlap and frequency domain transmission resources overlap;

time domain transmission resources overlap, frequency domain transmission resources do not overlap, and reception or sending of more than one transmission at a same time instant is not supported at the terminal side.

Optionally, it is determined that the priority of the first transmission is higher than the priority of the second transmission when a relation between the first transmission and the second transmission satisfies at least one of following conditions:

a sending time of the first DCI is later than a sending time of a second DCI for scheduling the second transmission;

the second transmission is semi-statically configured transmission;

a transmission length of the first transmission is less than a transmission length of the second transmission;

it is determined that the priority of the first transmission is higher than the priority of the second transmission according to transmission parameters corresponding to the first transmission and the second transmission respectively.

Optionally, the transmission parameters include at least one of following parameters:

DCI, a radio network temporary identifier (RNTI), a control resource set (CORESET), a search space, a target block error rate (BLER), a channel quality indicator (CQI), a modulation and coding scheme (MCS) table and a priority flag.

Optionally, that the time instant of sending the first DCI is not later than the time instant with the time duration T before the starting symbol of the second transmission includes:

a first symbol or a last symbol of the first DCI is not later than the time instant with the time duration T before the starting symbol of the second transmission; or, a first symbol or a last symbol of a CORESET where the first DCI is transmitted is not later than the time instant with the time duration T before the starting symbol of the second transmission; or, the first symbol or the last symbol of the first DCI is not later than a first symbol with the time duration T before the starting symbol of the second transmission; or, the first symbol or the last symbol of the CORESET where the first DCI is transmitted is not later than the first symbol with the time duration T before the starting symbol of the second transmission.

Optionally, the time duration T includes T OFDM symbols or T time lengths.

Optionally, as shown in FIG. 8, the apparatus further includes a processing module 802 configured to:

abandon receiving the second transmission when the first transmission and the second transmission are uplink transmission;

abandon sending the second transmission when the first transmission and the second transmission are downlink transmission.

Figure 9:
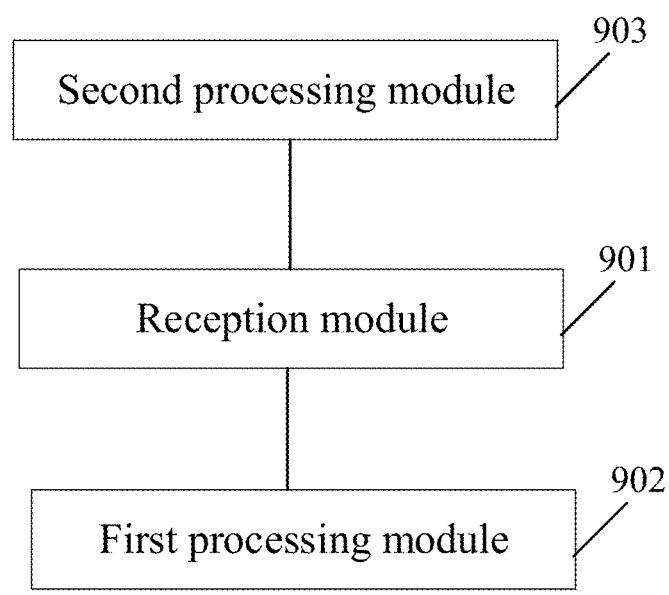
FIG. 9 is a schematic structural diagram of another implementation of a data transmission apparatus according to some embodiments of the present disclosure.

Some embodiments of the present disclosure further provide a data transmission apparatus applied to user equipment. As shown in FIG. 9, the apparatus includes:

a reception module 901, configured to receive a first downlink control information (DCI) for scheduling a first transmission;

wherein in a case that a relation between the first transmission and scheduled or configured second transmission satisfies a preset condition, a time instant of receiving the first DCI is not later than a time instant with a time duration T before a starting symbol of the second transmission.

Optionally, the preset condition includes at least one of following conditions:

the first transmission and the second transmission are in a same cell or on a same carrier, a transmission resource of the first transmission overlaps a transmission resource of the second transmission, and a priority of the first transmission is higher than a priority of the second transmission;

the first transmission and the second transmission are in a same cell or on a same carrier, the first transmission and the second transmission are transmitted on different time domain resources in a same slot, reception or sending of more than one transmission in a same slot in a same cell or on a same carrier is not supported at a terminal side, and a priority of the first transmission is higher than a priority of the second transmission.

Optionally, that the transmission resource of the first transmission overlaps the transmission resource of the second transmission includes at least one of following:

only time domain transmission resources overlap;

time domain transmission resources overlap and frequency domain transmission resources overlap;

time domain transmission resources overlap, frequency domain transmission resources do not overlap, and reception or sending of more than one transmission at a same time instant is not supported at the terminal side.

Optionally, it is determined that the priority of the first transmission is higher than the priority of the second transmission when a relation between the first transmission and the second transmission satisfies at least one of following conditions:

a sending time of the first DCI is later than a sending time of a second DCI for scheduling the second transmission;

the second transmission is semi-statically configured transmission;

a transmission length of the first transmission is less than a transmission length of the second transmission;

it is determined that the priority of the first transmission is higher than the priority of the second transmission according to transmission parameters corresponding to the first transmission and the second transmission respectively.

Optionally, the transmission parameters include at least one of following parameters:

DCI, a radio network temporary identifier (RNTI), a control resource set (CORESET), a search space, a target block error rate (BLER), a channel quality indicator (CQI), a modulation and coding scheme (MCS) table and a priority flag.

Optionally, in the case that a relation between the first transmission and the scheduled or configured second transmission satisfies the preset condition, that the time instant of receiving the first DCI is not later than the time instant with the time duration T before the starting symbol of the second transmission includes:

a first symbol or a last symbol of the first DCI is not later than the time instant with the time duration T before the starting symbol of the second transmission; or, a first symbol or a last symbol of a CORESET where the first DCI is transmitted is not later than the time instant with the time duration T before the starting symbol of the second transmission; or, the first symbol or the last symbol of the first DCI is not later than a first symbol with the time duration T before the starting symbol of the second transmission; or, the first symbol or the last symbol of the CORESET where the first DCI is transmitted is not later than the first symbol with the time duration T before the starting symbol of the second transmission.

Optionally, the time duration T includes T OFDM symbols or T time lengths.

Optionally, as shown in FIG. 9, the apparatus further includes a first processing module 902 configured to:

abandon sending the second transmission when the first transmission and the second transmission are uplink transmission;

abandon receiving the second transmission when the first transmission and the second transmission are downlink transmission.

Optionally, the apparatus further includes a second processing module 903 configured to: after the first DCI for scheduling the first transmission is received, determine that the first DCI is an erroneous scheduling if the time instant of receiving the first DCI is later than the time instant with the time duration T before the starting symbol of the second transmission, in the case that a relation between the first transmission and the scheduled or configured second transmission satisfies the preset condition.

Some embodiments of the present disclosure further provide a computer readable storage medium storing therein a computer program, wherein the computer program is configured to be executed by a processor, to implement various processes of the embodiments of the foregoing data transmission methods, and may achieve the same technical effects. To avoid redundancy, a detailed description is omitted herein. The computer readable storage medium is such as a Read-Only Memory (ROM), a Random Access Memory (RAM), a magnetic disk or an optical disc.

It should be noted that terms "include", "have", or any variation thereof used herein are intended to cover a non-exclusive inclusion, such that a process, a method, an article, or a device that includes a list of elements not only includes the list of elements, but also may include other elements not expressly listed or include elements inherent in the process, the method, the article, or the device. In case that there is no further limitation, an element preceded by "includes or including" does not preclude existence of additional identical elements in the process, the method, the article, or the device including the element.

From the foregoing description of the embodiments, a person skilled in the art will clearly appreciate that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The software product is stored in a storage medium (e.g., a ROM/RAM, a magnetic disk and an optical disc) and includes several instructions configured to be executed by a terminal (such as a handset, a computer, a server, an air conditioner or a network device) to perform the method according to the embodiments of the present disclosure.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Those skilled in the art may clearly understand that, to achieve ease and simple description, detailed operation processes of the above system, apparatus and unit are obtained by referring to corresponding processes in the above method embodiments, which are not repeated herein.

In the embodiments provided herein, it should be understood that, the disclosed apparatuses and methods may be implemented in other ways. For example, the device embodiments provided above are only illustrative, for example, a division to units is only a logical functional division, and other division exists in practical application. For example, multiple units or elements may be combined or integrated into another system, or some features may be ignored or not executed. Additionally, coupling or direct connection or communication connection between elements shown or discussed herein may be implemented via some interfaces, and indirect coupling or communication connections between units or elements may be electrical, mechanical or other coupling or connections.

Units described as separated elements may be or may not be physically distributed. Units shown as elements may be or may not be physical units, i.e., may be collocated in one place or distributed over multiple network units. Some or all of the units may be selected depending on actual application scenarios to implement the purpose of the technical solutions of the embodiments.

Additionally, functional units in the embodiments of the present application may be integrated in one processing units, or may be provided independently, or two or more units may be integrated as one unit.

The functions may be stored in one computer readable storage medium if being implemented by software function units and sold or used as independent products. Based on such understanding, the essential part, or the part contributing the related art, or a part of the technical solutions of the present disclosure may be embodied in software products, which are stored in a storage medium. The computer storage medium includes several instructions used to cause a computer device (which may be a personal computer, a server, or a network device, or the like) to execute all or a part of the steps in the method embodiments of the present disclosure. The storage medium include various medium capable of storing program codes, such as a flash memory, a removable disk, a ROM, a RAM, a magnetic disc, or a compact disk.

Those skilled in the art may understand that an entirety or a part of flows in the method embodiments of the present disclosure may be achieved by a computer program which controls related hardware. The program may be stored in a computer readable storage medium. When the program is executed, the flows in the method embodiments of the present disclosure are implemented. The storage medium may be a magnetic disc, a compact disk, a Read-Only Memory (ROM) or a Random Access Memory (RAM).

It may be understood that these embodiments described in embodiments of the present disclosure may be implemented by hardware, software, firmware, middleware, microcode or a combination thereof. For hardware implementation, a processing unit may be implemented in one or more Application Specific Integrated Circuits (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, other electronic unit configured to perform the functions in the present disclosure or a combination thereof.

For a software implementation, the techniques described in embodiments of the present disclosure may be implemented by modules (for example, processes or functions) performing the functions described in embodiments of the present disclosure. Software codes may be stored in a storage and executed by a processor. The storage may be implemented internal or external to a processor.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the gist of the present disclosure and the scope of the claims, and these forms all fall within the scope of the present disclosure.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A data transmission method, performed by a network side device, comprising:
    sending a first downlink control information (DCI) for scheduling a first transmission for a User Equipment (UE);
    wherein in a case that a relation between a second transmission having been scheduled or configured for the UE and the first transmission scheduled by the first DCI satisfies a preset condition, a time instant of sending the first DCI is not later than a time instant with a time duration T before a starting symbol of the second transmission for the UE, wherein a value of the time duration T is configured or determined before sending the first DCI, or is obtained according to configuration information before sending the first DCI;

the preset condition comprises at least one of following conditions:
the first transmission and the second transmission are in a same cell or on a same carrier, a transmission resource of the first transmission overlaps a transmission resource of the second transmission, and a priority of the first transmission is higher than a priority of the second transmission; or
the first transmission and the second transmission are in a same cell or on a same carrier, the first transmission and the second transmission are transmitted on different time domain resources in a same slot, reception or sending of more than one transmission in a same slot in a same cell or on a same carrier is not supported at a terminal side, and a priority of the first transmission is higher than a priority of the second transmission.

2. The data transmission method according to claim 1, wherein, the time duration T comprises T OFDM symbols or T time lengths.

3. The data transmission method according to claim 2, wherein,
the transmission resource of the first transmission overlaps the transmission resource of the second transmission comprises at least one of following cases:
only time domain transmission resources overlap;
time domain transmission resources overlap and frequency domain transmission resources overlap;
time domain transmission resources overlap, frequency domain transmission resources do not overlap, and reception or sending of more than one transmission at a same time instant is not supported at a terminal side;
the priority of the first transmission is determined being higher than the priority of the second transmission when the relation between the first transmission and the second transmission satisfies at least one of following conditions:
a sending time of the first DCI is later than a sending time of a second DCI for scheduling the second transmission;
the second transmission is semi-statically configured transmission;
a transmission length of the first transmission is less than a transmission length of the second transmission;
the priority of the first transmission is higher than the priority of the second transmission according to transmission parameters corresponding to the first transmission and the second transmission respectively;
wherein the transmission parameters comprise at least one of following parameters:
DCI, a radio network temporary identifier (RNTI), a control resource set (CORESET), a search space, a target block error rate (BLER), a channel quality indicator (CQI), a modulation and coding scheme (MCS) table and a priority flag.

4. The data transmission method according to claim 1, wherein the time instant of sending the first DCI is not later than the time instant with the time duration T before the starting symbol of the second transmission comprises:

a first symbol or a last symbol of the first DCI is not later than the time instant with the time duration T before the starting symbol of the second transmission; or,
a first symbol or a last symbol of a CORESET where the first DCI is transmitted is not later than the time instant with the time duration T before the starting symbol of the second transmission; or,
a first symbol or a last symbol of the first DCI is not later than a first symbol with the time duration T before the starting symbol of the second transmission; or,
a first symbol or a last symbol of the CORESET where the first DCI is transmitted is not later than a first symbol with the time duration T before the starting symbol of the second transmission.

5. The data transmission method according to claim 1, further comprising:
abandoning receiving the second transmission when the first transmission and the second transmission are uplink transmission;
abandoning sending the second transmission when the first transmission and the second transmission are downlink transmission.

6. A data transmission method, performed by user equipment, comprising:
receiving a first downlink control information (DCI) for scheduling a first transmission;
wherein in a case that a relation between a second transmission having been scheduled or configured and the first transmission scheduled by the first DCI satisfies a preset condition, a time instant of receiving the first DCI is not later than a time instant with a time duration T before a starting symbol of the second transmission, wherein a value of the time duration T is configured or determined before sending the first DCI, or is obtained according to configuration information before sending the first DCI,
wherein,
the preset condition comprises at least one of following conditions:
the first transmission and the second transmission are in a same cell or on a same carrier, a transmission resource of the first transmission overlaps a transmission resource of the second transmission, and a priority of the first transmission is higher than a priority of the second transmission; or
the first transmission and the second transmission are in a same cell or on a same carrier, the first transmission and the second transmission are transmitted on different time domain resources in a same slot, reception or sending of more than one transmission in a same slot in a same cell or on a same carrier is not supported at a terminal side, and a priority of the first transmission is higher than a priority of the second transmission.

7. The data transmission method according to claim 6, wherein, the time duration T comprises T OFDM symbols or T time lengths.

8. The data transmission method according to claim 7, wherein,
the transmission resource of the first transmission overlaps the transmission resource of the second transmission comprises at least one of following cases:
only time domain transmission resources overlap;
time domain transmission resources overlap and frequency domain transmission resources overlap;
time domain transmission resources overlap, frequency domain transmission resources do not overlap, and reception or sending of more than one transmission at a same time instant is not supported at the terminal side;

and/or, the priority of the first transmission is determined being higher than the priority of the second transmission when the relation between the first transmission and the second transmission satisfies at least one of following conditions:
  a sending time of the first DCI is later than a sending time of a second DCI for scheduling the second transmission;
  the second transmission is semi-statically configured transmission;
  a transmission length of the first transmission is less than a transmission length of the second transmission;
  the priority of the first transmission is determined being higher than the priority of the second transmission according to transmission parameters corresponding to the first transmission and the second transmission respectively;

wherein, the transmission parameters comprise at least one of following parameters:
  DCI, a radio network temporary identifier (RNTI), a control resource set (CORESET), a search space, a target block error rate (BLER), a channel quality indicator (CQI), a modulation and coding scheme (MCS) table and a priority flag.

9. The data transmission method according to claim 6, wherein, in the case that the relation between second transmission having been scheduled or configured and the first transmission scheduled by the first DCI satisfies the preset condition, that the time instant of receiving the first DCI is not later than the time instant with the time duration T before the starting symbol of the second transmission comprises:
  a first symbol or a last symbol of the first DCI is not later than the time instant with the time duration T before the starting symbol of the second transmission; or,
  a first symbol or a last symbol of a CORESET where the first DCI is transmitted is not later than the time instant with the time duration T before the starting symbol of the second transmission; or,
  a first symbol or a last symbol of the first DCI is not later than a first symbol with the time duration T before the starting symbol of the second transmission; or,
  a first symbol or a last symbol of the CORESET where the first DCI is transmitted is not later than a first symbol with the time duration T before the starting symbol of the second transmission.

10. The data transmission method according to claim 6, further comprising:
  abandoning sending the second transmission when the first transmission and the second transmission are uplink transmission;
  abandoning receiving the second transmission when the first transmission and the second transmission are downlink transmission.

11. A network side device, comprising:
  a storage, a processor and a program stored in the storage and executable by the processor, wherein the processor is configured to execute the program to implement a data transmission method, the data transmission method comprise following steps:
  sending a first downlink control information (DCI) for scheduling a first transmission for a User Equipment (UE);

wherein in a case that a relation between a second transmission having been scheduled or configured for the UE and the first transmission scheduled by the first DCI satisfies a preset condition, a time instant of sending the first DCI is not later than a time instant with a time duration T before a starting symbol of the second transmission for the UE, wherein a value of the time duration T is configured or determined before sending the first DCI, or is obtained according to configuration information before sending the first DCI, wherein the preset condition comprises at least one of following conditions:
  the first transmission and the second transmission are in a same cell or on a same carrier, a transmission resource of the first transmission overlaps a transmission resource of the second transmission, and a priority of the first transmission is higher than a priority of the second transmission; or
  the first transmission and the second transmission are in a same cell or on a same carrier, the first transmission and the second transmission are transmitted on different time domain resources in a same slot, reception or sending of more than one transmission in a same slot in a same cell or on a same carrier is not supported at a terminal side, and a priority of the first transmission is higher than a priority of the second transmission.

12. The network side device according to claim 11, wherein, the time duration T comprises T OFDM symbols or T time lengths.

13. The network side device according to claim 12, wherein, the transmission resource of the first transmission overlaps the transmission resource of the second transmission comprises at least one of following cases:
  only time domain transmission resources overlap;
  time domain transmission resources overlap and frequency domain transmission resources overlap;
  time domain transmission resources overlap, frequency domain transmission resources do not overlap, and reception or sending of more than one transmission at a same time instant is not supported at a terminal side;
  the priority of the first transmission is determined being higher than the priority of the second transmission when the relation between the first transmission and the second transmission satisfies at least one of following conditions:
  a sending time of the first DCI is later than a sending time of a second DCI for scheduling the second transmission;
  the second transmission is semi-statically configured transmission;
  a transmission length of the first transmission is less than a transmission length of the second transmission;
  the priority of the first transmission is determined being higher than the priority of the second transmission according to transmission parameters corresponding to the first transmission and the second transmission respectively;

wherein the transmission parameters comprise at least one of following parameters:
  DCI, a radio network temporary identifier (RNTI), a control resource set (CORESET), a search space, a target block error rate (BLER), a channel quality indicator (CQI), a modulation and coding scheme (MCS) table and a priority flag.

14. The network side device according to claim 11, wherein, the time instant of sending the first DCI is not later than the time instant with the time duration T before the starting symbol of the second transmission comprises:
- a first symbol or a last symbol of the first DCI is not later than the time instant with the time duration T before the starting symbol of the second transmission; or,
- a first symbol or a last symbol of a CORESET where the first DCI is transmitted is not later than the time instant with the time duration T before the starting symbol of the second transmission; or,
- a first symbol or a last symbol of the first DCI is not later than a first symbol with the time duration T before the starting symbol of the second transmission; or,
- a first symbol or a last symbol of the CORESET where the first DCI is transmitted is not later than a first symbol with the time duration T before the starting symbol of the second transmission.

15. The network side device according to claim 11, wherein, the processor is configured to execute the program to further implement:
- abandoning receiving the second transmission when the first transmission and the second transmission are uplink transmission;
- abandoning sending the second transmission when the first transmission and the second transmission are downlink transmission.

16. User equipment, comprising:
a storage, a processor and a program stored in the storage and executable by the processor, wherein the processor is configured to execute the program to implement a data transmission method, the data transmission method comprises following steps:
receiving a first downlink control information (DCI) for scheduling a first transmission;
wherein in a case that a relation between a second transmission having been scheduled or configured and the first transmission scheduled by the first DCI satisfies a preset condition, a time instant of receiving the first DCI is not later than a time instant with a time duration T before a starting symbol of the second transmission, wherein a value of the time duration T is configured or determined before sending the first DCI, or is obtained according to configuration information before sending the first DCI,
wherein the preset condition comprises at least one of following conditions:
- the first transmission and the second transmission are in a same cell or on a same carrier, a transmission resource of the first transmission overlaps a transmission resource of the second transmission, and a priority of the first transmission is higher than a priority of the second transmission; or
- the first transmission and the second transmission are in a same cell or on a same carrier, the first transmission and the second transmission are transmitted on different time domain resources in a same slot, reception or sending of more than one transmission in a same slot in a same cell or on a same carrier is not supported at a terminal side, and a priority of the first transmission is higher than a priority of the second transmission.

17. The user equipment according to claim 16, wherein, the time duration T comprises T OFDM symbols or T time lengths.

18. The user equipment according to claim 17, wherein, the transmission resource of the first transmission overlaps the transmission resource of the second transmission comprises at least one of following cases:
- only time domain transmission resources overlap;
- time domain transmission resources overlap and frequency domain transmission resources overlap;
- time domain transmission resources overlap, frequency domain transmission resources do not overlap, and reception or sending of more than one transmission at a same time instant is not supported at the terminal side;

and/or,
the priority of the first transmission is determined being higher than the priority of the second transmission when the relation between the first transmission and the second transmission satisfies at least one of following conditions:
- a sending time of the first DCI is later than a sending time of a second DCI for scheduling the second transmission;
- the second transmission is semi-statically configured transmission;
- a transmission length of the first transmission is less than a transmission length of the second transmission;
- the priority of the first transmission is determined being higher than the priority of the second transmission according to transmission parameters corresponding to the first transmission and the second transmission respectively;

wherein, the transmission parameters comprise at least one of following parameters:
DCI, a radio network temporary identifier (RNTI), a control resource set (CORESET), a search space, a target block error rate (BLER), a channel quality indicator (CQI), a modulation and coding scheme (MCS) table and a priority flag.

19. The user equipment according to claim 16, wherein, in the case that a relation between the second transmission having been scheduled or configured and the first transmission scheduled by the first DCI satisfies the preset condition, that the time instant of receiving the first DCI is not later than the time instant with the time duration T before the starting symbol of the second transmission comprises:
- a first symbol or a last symbol of the first DCI is not later than the time instant with the time duration T before the starting symbol of the second transmission; or,
- a first symbol or a last symbol of a CORESET where the first DCI is transmitted is not later than the time instant with the time duration T before the starting symbol of the second transmission; or,
- a first symbol or a last symbol of the first DCI is not later than a first symbol with the time duration T before the starting symbol of the second transmission; or,
- a first symbol or a last symbol of the CORESET where the first DCI is transmitted is not later than a first symbol with the time duration T before the starting symbol of the second transmission.

20. The user equipment according to claim 16, wherein, the processor is configured to execute the program to further implement:
- abandoning sending the second transmission when the first transmission and the second transmission are uplink transmission;
- abandoning receiving the second transmission when the first transmission and the second transmission are downlink transmission.

* * * * *